Nov. 17, 1959  E. L. MYERS  2,913,185
AIR OPERATED CONTROLLER EMBODYING VARIABLE AIR
VALVE FOR DIRECT ACTING OR REVERSE
ACTING MOTOR VALVE SYSTEM
Filed June 1, 1953  2 Sheets-Sheet 1
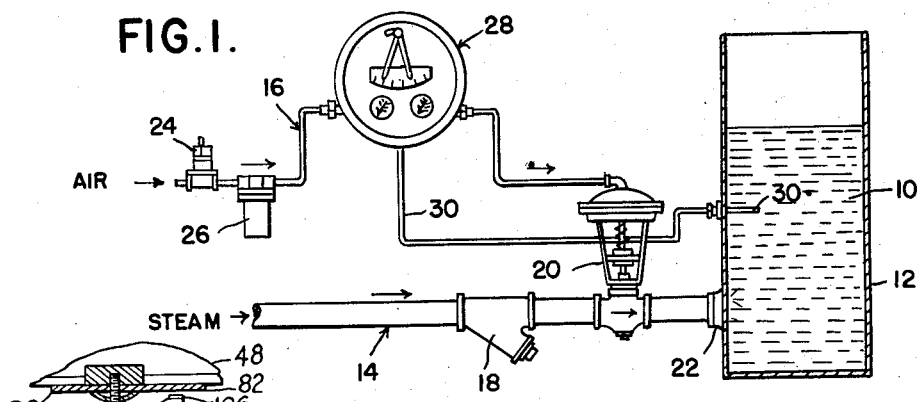
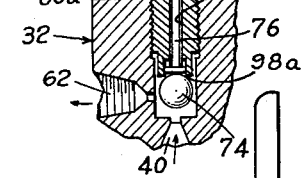
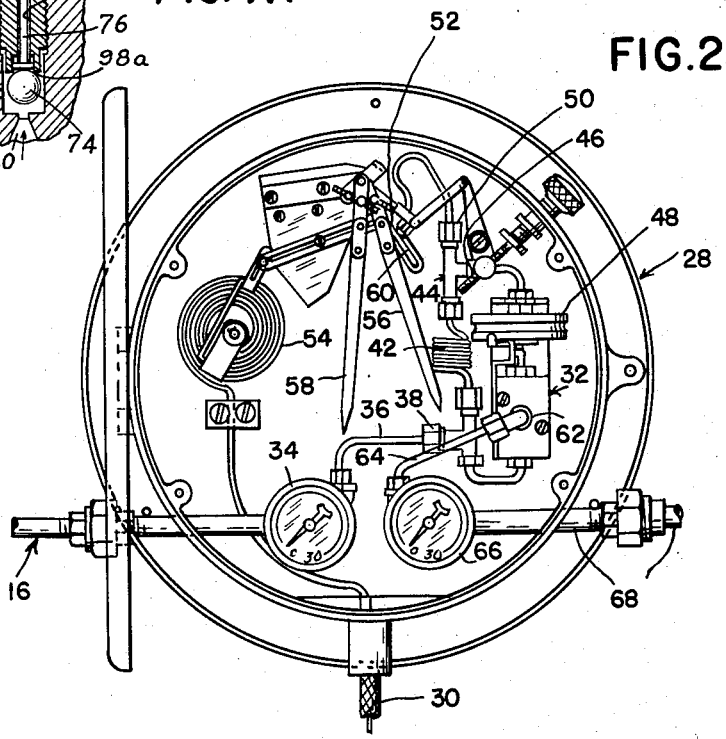
INVENTOR.
ERROL L. MYERS
BY
ATTORNEYS Nov. 17, 1959
E. L. MYERS
2,913,185
AIR OPERATED CONTROLLER EMBODYING VARIABLE AIR
VALVE FOR DIRECT ACTING OR REVERSE
ACTING MOTOR VALVE SYSTEM
Filed June 1, 1953
2 Sheets-Sheet 2

INVENTOR.
ERROL L. MYERS
BY
*Hauke + Hardesty*
ATTORNEYS

United States Patent Office 2,913,185
Patented Nov. 17, 1959

2,913,185

AIR OPERATED CONTROLLER EMBODYING VARIABLE AIR VALVE FOR DIRECT ACTING OR REVERSE ACTING MOTOR VALVE SYSTEM

Errol L. Myers, Detroit, Mich., assignor to Howard O. Trerice, Detroit, Mich.

Application June 1, 1953, Serial No. 358,881

7 Claims. (Cl. 236—86)

This invention relates to an air or fluid pressure operated controller embodying pressure valve mechanism therefor which has direct acting and reverse acting features for use in a pressure system typically including either a direct acting or a reverse acting diaphragm type motor valve, and more particularly to an air or fluid pressure operated controller in which the pressure valve mechanism therein comprises a control which can be adjusted for direct acting or reverse acting by a slight manual operation whereby the character of the valve action is respectively direct or reverse acting.

For example, a typical system in which an air or fluid pressure operated controller is particularly suitable is one in which a volume of water in a tank is to be maintained at a constant temperature. Where the water is being heated by steam, a steam supply conduit is introduced into the tank at an appropriate point. A diaphragm type motor valve is installed in the steam line, whereby upon opening of the motor valve, steam is admitted into the tank. The steam may be passed directly into the water, or it may pass through a coil immersed in the water. Either way, the water becomes heated. When the motor valve closes, the steam is shut off and no further heating of the tank water occurs.

A diaphragm type motor valve is pressure operated, usually at a pressure of the order of 15 lbs. per square inch. To actuate the motor valve, a temperature sensitive pressure operated controller is employed in the sytem. A pressure supply line leads into the controller which embodies therein temperature sensitive indicators and an indicator responsive pressure valve mechanism which passes the pressure to the diaphragm of the motor valve and thus actuates and operates the motor valve to either close or open the steam line. If the motor valve closes upon application of air pressure thereto, it is considered a direct acting valve; if the motor valve opens upon application of pressure, it is considered a reverse acting valve.

Likewise within the controller itself, since the passage of pressure to the motor valve is subject to control by a pressure valve, the pressure valve is considered direct acting when the pressure will normally flow through an open valve system to the diaphragm motor valve, and will be actuated by the temperature sensitive elements of the controller to shut off the flow of pressure to the motor valve. The pressure valve is reverse acting when it is normally held in shut-off position and opens only upon actuation of the temperature sensitive elements of the controller.

Therefore, the change from direct to reverse acting systems in the controller is accomplished by substitution of one kind of valve for the other or by rearranging the pressure lines. This is usually a difficult and time-consuming operation and subsequent fine adjustments in the valves are often required upon such substitution or rearrangement, entailing considerable labor and expense, as well as requiring maintaining of an additional stock of valves. In industry, where such controllers and valves are widely used, the cost of such a change-over from direct to reverse-acting systems is indeed considerable.

Therefore, an object of this invention is to avoid the requirement for the replacement or rearrangement of parts aforesaid by devising means to accomplish the change-over from one system to another within the pressure valve mechanism of the controller through a simple selective adjustment.

Another object of the invention is to increase the versatility of air or fluid pressure controllers by providing same with both direct and reverse acting characteristics.

A further object is to make the changeover of a controller from one system to another a simple servicing matter by providing a pressure valve mechanism therein comprising a relatively simple control which may be manually adjusted to either a direct or reverse acting position.

A still further object of the invention is to increase the versatility of fluid pressure valve mechanisms generally by providing said valves with an easily adjustable control which will actuate the valve for direct or reverse acting as desired.

Other features of the construction will become more apparent on examination of the description of the invention below. For a visual understanding of the invention, reference is made to the accompanying drawings in which like parts are referred to by like reference numerals throughout the several views illustrating a preferred embodiment of the invention, and in which Fig. 1 is a diagrammatic outline of a typical system for controlling the temperature of water or other liquid in a tank, embodying the present invention.

Fig. 2 is a front elevation of a preferred temperature indicating controller mechanism employed in the system of Fig. 1.

Fig. 4a is similar to Fig. 4 but with the valve in direct acting position.

Figure 3:
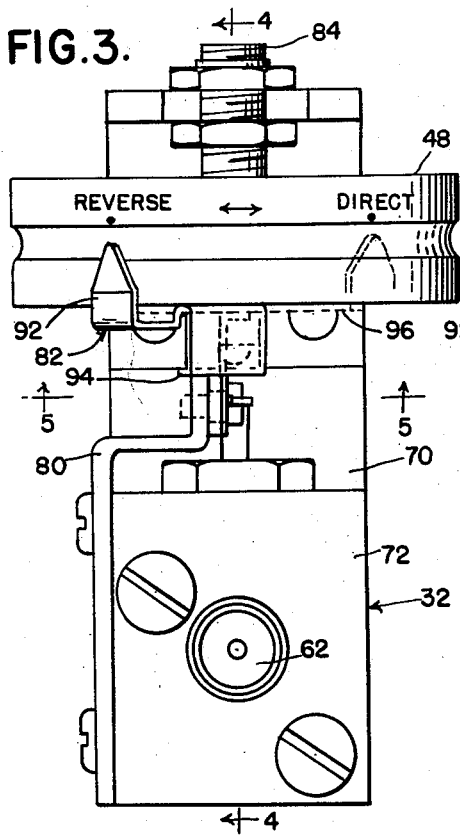
Fig. 3 is a front elevation of the pressure valve mechanism constructed according to the present invention and embodied in the controller shown in Fig. 2.

As illustrated in Fig. 1, a typical system employed for controlling and raising the temperature of a liquid 10 in tank 12 consists of a steam line 14 and an air or fluid pressure control line 16. The steam line 14 is arranged to introduce steam heat into the liquid 10. It will be obvious to those skilled in the art to which this invention pertains that the liquid 10 may also be cooled by line 14, if a coil (not shown) were added to the tank end of the line, immersed in the liquid 10 and a refrigerant or cold water passed through the line and coil. For purposes of description in this application, the line 14 will be considered as a steam line for use in raising the temperature of the liquid 10 in tank 12, with the distinct understanding that fluids other than steam may be employed therein to raise or lower the liquid temperature.

Steam line 14 includes in series a strainer element 18, a diaphragm type air operated motor valve 20 to control the passage of steam to the tank 12 and a tank coupling 22 connecting the line to the tank. It should be noted also that any suitable type of air or fluid pressure actuated valve may be utilized for the same purpose as the illustrated motor valve.

The pressure control line 16 includes in series a pressure reducing valve 24, a filter 26, a temperature indicating type controller 28, and the motor valve 20. A temperature responsive element 30 is operatively associated with the controller 28, and extends therefrom into the tank 12, where temperature changes in liquid 10 cause a response in the controller function. Within the controller 28 and a vital part of its related elements is the pressure valve mechanism 32, which may be direct acting or reverse acting in character.

At this point it will be of interest to consider the relationship of a direct acting or reverse acting diaphragm type pressure operated motor valve 20 to the controller pressure valve 32. In a heating system having one source of heat supply, it may be desirable to use a reverse acting motor valve, which opens by the application of pressure, and a direct acting pressure valve mechanism, which normally supplies the pressure to keep the motor valve open. As the tank temperature reaches the desired point, the pressure valve shuts off pressure to the motor valve, which closes and stops the flow of steam to the tank. If it is desirable to use a direct acting motor valve, which closes by the application of pressure, a reverse acting pressure valve mechanism would normally shut off pressure to the motor valve which in turn would be normally open. As temperature rises to the desired point, the pressure valve mechanism directs pressure to the motor valve, closing same and again stopping the flow of steam.

In a cooling system, it may be desirable to utilize a direct acting motor valve and a direct acting pressure valve mechanism. In this case, pressure normally is directed from the pressure valve to the motor valve, keeping it closed. When the temperature gets too high, the pressure valve stops the flow of pressure to the motor valve, which thereupon opens to permit coolant to pass to the coils in the tank.

In more complex systems, such as where there is one source of heating supply and one source of cooling supply, separate heating and cooling motor valves 20 are used with a single controller pressure valve 32. The direct or reverse acting character of the pressure valves is related to whether the heating and cooling motor valves are normally open or closed. Where two sources of heating supply are employed, the relationships of the valves are further qualified in respect to normally open or closed motor valves on live or exhaust steam lines. Innumerable combinations are possible, as is readily apparent.

It can therefore be seen that whether the motor valve 20 is normally open or closed determines whether the mechanism valve 32 is to be direct or reverse acting. Heretofore the only way in which the controller 28 could be used was to ascertain beforehand the open or closed character of the motor valve 20 and whether the system employed a heating or cooling fluid. Upon determining these facts, a direct acting or reverse acting valve mechanism 32 was installed in controller 28 to suit the conditions of the system. If the system was modified from heating to cooling, or from a direct acting normally open motor valve 20 to a normally closed reverse acting motor valve, the valve mechanism 32 had to be changed. This change involved either a complete replacement of the valve mechanism 32 or some other complex modification of the system. As will be seen from the description given below, such a change involved considerable time and skill, often in terms of hours and costly labor. During this period, production down time added to the burden in terms of cost and waste.

To eliminate this waste, the invention herein described provides a single fluid pressure valve mechanism 32 which may be made direct acting or reverse acting by a simple manual movement of a lever.

In the pressure operated control line 16, the air or fluid pressure is reduced to about 15 lbs. per square inch by the pressure reducing valve 24, and subsequently passes into the controller 28. The pressure first enters an entry pressure gauge 34, which indicates the pressure on a dial, then flows through tube 36 to a T 38. As seen in Fig. 2, the lower side of this T passes the pressure to the bottom entry port 40 of pressure valve mechanism 32. The upper side of the T 38 passes the pressure to a restriction coil 42 or any suitable fluid pressure flow restricting means, and thence to a second T 44, the side arm of which 46, leads to pressure responsive actuator such as a bellows 48, and the upper arm of which, 50, leads to a fluid pressure bleed nozzle 52.

Returning for the moment to the temperature responsive element 30, this element leads from the liquid 10 in tank 12 to a spring 54 which expands or contracts with a rise or drop in the liquid temperature. The expansion of spring 54, by lever connection, actuates a temperature indicating arm 56 which passes below a temperature scale (not shown). A temperature pointer 58 is set by hand to show the desired control temperature. The temperature indicating arm 56 is connected to a bleed nozzle closing element or flapper 60, which stops further bleeding of pressure through nozzle 52 at the desired moment and closes the pressure system at this point subsequently resulting in a build-up of pressure in the line leading to the bellows 48.

The valve mechanism 32 contains an exhaust port 62 which passes the pressure through an exit tube 64, through an exit pressure indicating gauge 66, and then by tube 68 to the pressure operated motor valve 20.

Except for the pressure valve mechanism 32, to be more particularly described immediately below, the elements and parts as well as their application in the system above described are substantially well known in the art.

In addition to the pressure responsive bellows 48, the entry port 40 and the exhaust port 62, the pressure valve 32 mechanism includes a bellows support 70 fixed to one side of the valve assembly 72, a valve ball or other suitable pressure control valve 74, a valve pin 76, a rocker arm 78 pivotally mounted on a support bracket 80, as at 80a, and a cam element 82. It will be seen more clearly by reference to Figs. 3, 4, 4A, 5 and 6 that the bellows 48 is mounted in a support 70 by means of a hollow upper screw 84, through which pressure may flow into the bellows chamber 86, expanding the chamber. Substantially aligned with the axis of the upper screw 84 is a lower bellows fitting 88, affixed to the bellows and supporting the cam element 82 by means of a screw 90.

The cam element 82 has an upstanding pointer 92, and a depending inwardly directed cam portion 94 spaced from the main cam body portion 96 which lies substantially in a single horizontal plane parallel to the lower portion of the bellows 48. The cam element 82 rotates about a screw 90 as an axis.

Valve ball 74 lies over the pressure entry port 40 and is operable to be seated on a lower seat 40a or on an upper bleed port 98a and the valve pin 76 has its lower end 98 directly upon the ball 74. The pin 76 is slidingly movable in a bore 100a through a screw 100 which threads into the valve assembly 72. The pin 76 is either slightly smaller than the bore 100a, or may be of square or angular shape so that the bore 100a is also a bleed port. The upper end 102 of the pin 76 is in direct contact with the rocker arm 76, which comprises oppositely extending arms 104 and 104a. Two parallel vertically aligned, spaced apart, horizontally projecting lugs 106 are at the end of arm 104a, and a vertically projecting lug 108 is at the end of the arm 104. The lug 108 is approximately half way between lugs 106 in spacing.

Figure 4:
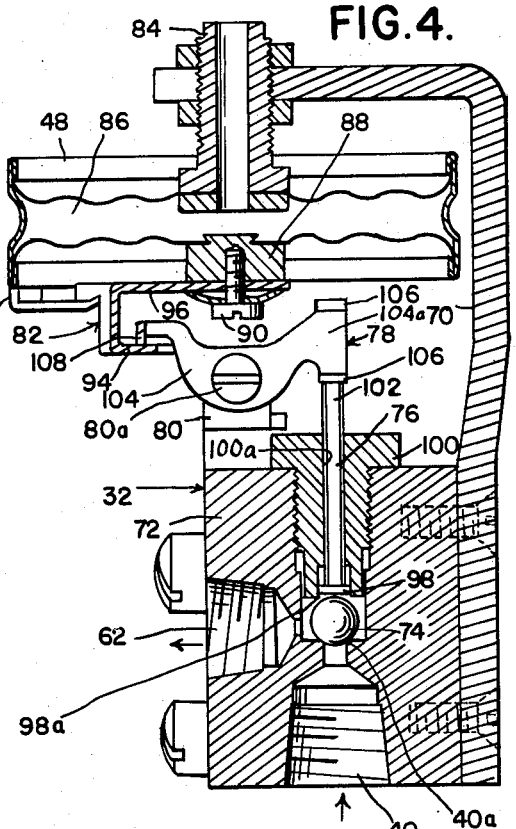
Fig. 4 is a vertical sectional view on the line 4—4 of Fig. 3, with the valve in reverse acting position.
Figure 5:
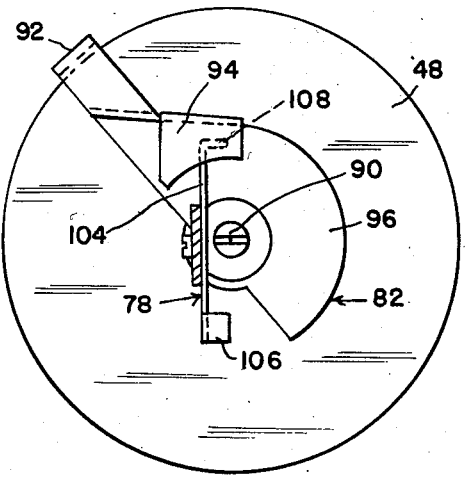
Fig. 5 is a view taken on the line 5—5 of Fig. 3 showing the pressure valve control in reverse acting position with respect to the valve.
Figure 6:
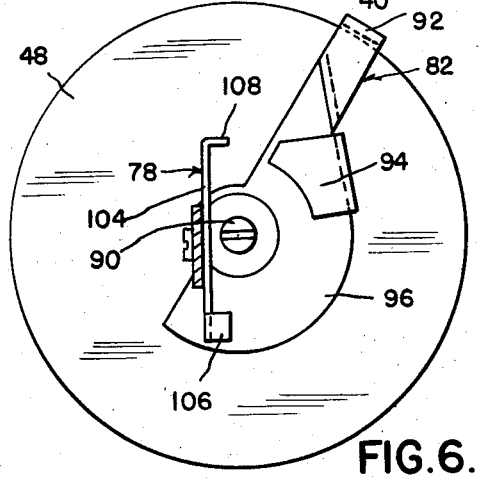
Fig. 6 is a view similar to Fig. 5 showing the control in direct acting position with respect to the valve.

In operation, the pointer 92 may be manually positioned for reverse acting, as illustrated in Figs. 4 and 5, or for direct acting, as illustrated in Figs. 4a and 6. In the direct acting position, it is observed that the pressure entering the port 40 forces the ball 74 upward against the seat 98a of the bore 100a, and thence passes out the port 62. The ball 74 forces the pin 76 upward and the pin, bearing on the lug 106 of the arm 104a, rotates the rocker arm 78 counterclockwise (see Fig. 4a) about the pivot 80a. Thus the upper lug 106 bears on the main cam body portion 96. Since the cam element 82 is supported on the actuator 48, downward vertical movement of the actuator 48 acts directly on the ball 74 through the arm 104a and the pin 76, operating to close the entry port 40.

In the reverse acting position, the depending cam portion 94 rides under the lug 108 of the arm 104, lifting it upward and rotating the rocker arm 78 clockwise about the pivot 80a (see Fig. 4). Thus the lower lug 106 of arm 104a forces the pin 76 and the ball 74 downward on the seat 40a, closing the entry port 40 against the air or fluid pressure, and opening the bore 100a which bleeds off any pressure existing in the line leading from the port 62 to the motor valve. Also, the main cam body portion is removed from contact with the upper lug 106. Now, when the actuator 48 moves the cam element 82 downward, the reverse operation is achieved, in which the rocker arm 78 is permitted freedom to rotate counterclockwise, and the pressure at the port 40 forces the ball upward against the seat 98a, closing the bore to bleed and permitting pressure to pass through the port 62.

The restriction coil 42 is arranged with an internal tube diameter less than the exit diameter of air bleed nozzle 52. This is so in order that there be no back pressure at the bleed nozzle 52 which might cause the bellows 48 to fill with air and release rocker arm lug 108 for downward movement when the valve mechanism 32 is arranged for reverse acting operation. In other words, bleed nozzle 52 should bleed off the flow from second T 44 until it is closed by element 60, which is in the nature of a simple flapper that swings against the exit of the nozzle 52. Closure element 60 is connected to temperature indicating arm 56 in such a way that upon reaching a predetermined temperature, the swing of indicating arm 56 will move the closure element 60 against and in cooperation with bleed nozzle 52 to close the same and prevent further exhausting of the pressure supply. Pressure will then build up in the bellows 48, activating the valve mechanism 32 in the manner above described.

It will be apparent to those skilled in the art to which this invention pertains that various modifications and changes may be made without departing from the spirit of the invention or from the scope of the appended claims.

I claim:

1. A fluid pressure operated temperature responsive controller for a fluid pressure operated motor valve consisting, in combination, of a fluid pressure valve mechanism for passing pressure to and closing off pressure from said motor valve, a temperature responsive fluid pressure control means, and a pressure flow system in said controller connecting said fluid pressure control means with said fluid pressure valve mechanism, said fluid pressure valve mechanism having a fluid pressure actuator, a valve assembly, inlet and exhaust ports in said valve assembly and connected by a chamber including a valve, a valve hold down pin actuated by a rocker arm on said valve assembly, said rocker arm having oppositely extending arms and being pivoted and movable in a vertical plane under said fluid pressure actuator, a cam element suspended from said fluid pressure actuator and having a rocker arm engaging cam portion spaced apart from and below a body portion thereof pivotally mounted horizontally on the underside of said fluid pressure actuator above said rocker arm, said cam portion being rotatable to a position under and subjacent one of said arms, and being rotatable to a second position where said body portion is over and in direct contact with the other arm of said rocker arm, said cam portion being out of engagement with said first arm.

2. A fluid pressure operated temperature responsive controller for a fluid pressure operated motor valve in a combination consisting of a fluid pressure valve mechanism for passing pressure to and closing off pressure from said motor valve, a temperature responsive fluid pressure control means, and a pressure flow system in said controller connecting said fluid pressure control means with said fluid pressure valve mechanism, said fluid pressure valve mechanism having a fluid pressure actuator responsive to pressure passed through said pressure flow system thereto, a valve assembly, inlet and exhaust ports in said valve assembly and connected by a chamber including a valve, a valve hold down pin actuated by a rocker arm pivotally mounted on said valve assembly and movable in a vertical plane, said rocker arm having oppositely extending arms, a cam element pivotally mounted and horizontally suspended from said fluid pressure actuator over said rocker arm and having a body portion horizontally rotatable to a position over one arm of said rocker arm, whereby said valve hold down pin is held in a depressed position upon said valve, said cam element having a rocker arm engaging cam portion spaced apart from and below said body portion and adapted to remain out of engagement and out of contact with the other arm of said rocker arm when said cam element is in said first position, said cam element being rotatable to a second position where said cam portion is in engaging contact with said second arm, said cam element body portion being then out of engagement with said first arm of said rocker arm.

3. A fluid pressure operated temperature responsive controller for a fluid pressure operated motor valve in a system where said motor valve is opened and closed by pressure flow controlled by said controller, in a combination consisting of a fluid pressure valve mechanism passing pressure to and closing off pressure from said motor valve, temperature responsive fluid pressure control means, and a pressure flow system in said controller connecting said fluid pressure control means with said fluid pressure valve mechanism, said fluid pressure valve mechanism consisting of a fluid pressure actuator responsive to pressure passed through said pressure system thereto, a valve assembly, inlet and exhaust ports in said valve assembly and connected by a chamber including a valve, a valve hold down pin actuated by a rocker arm pivotally mounted on said valve assembly and movable in a vertical plane, said rocker arm having oppositely extending arms, one of said arms arranged to rest upon and over said valve hold down pin, a cam element pivotally mounted and horizontally rotatable and suspended from said fluid pressure actuator over said rocker arm and having a cam portion spaced apart from and below a body portion, arranged to pass below and into holding engagement with the other arm of said rocker arm when said cam element is horizontally rotated to one position, and when said cam element is horizontally rotated so that said cam portion is out of engagement with said second mentioned arm and free thereof, said cam element body portion will be suspended above said first mentioned arm of said rocker arm.

4. In a fluid pressure operated controller for a fluid pressure operated motor valve the combination consisting of a fluid pressure valve mechanism passing pressure to and closing off pressure from said motor valve, temperature responsive fluid pressure control means, a pressure flow conduit connecting said fluid pressure control means and said fluid pressure valve mechanism, said fluid pressure valve mechanism consisting of a pressure responsive and expandable bellows arranged over a valve assembly, inlet and exhaust ports in said valve assembly and connected by a chamber including a valve, a pin slidingly disposed in a valve assembly bore over said valve, a rocker arm having oppositely extending arms and pivotally arranged to oscillate in a vertical plane, one of said arms over and resting upon said pin, a cam element horizontally suspended from and pivotally mounted to rotate under said bellows and having a cam portion spaced apart from and below the body portion thereof, said cam portion being disposed under and in supporting uplifting engagement with the other arm of said rocker arm when said cam element is in one rotated position, said cam element body portion being disposed over said first mentioned arm of said rocker arm with said cam portion being disengaged from and out of alignment with said rocker arm second arm when said cam element is rotated to a second position.

5. In a fluid pressure operated controller for a fluid pressure operated motor valve, the combination of a fluid pressure valve mechanism passing pressure to and closing off pressure from said motor valve, temperature responsive fluid pressure control means, a pressure flow conduit connecting said fluid pressure control means and said fluid pressure valve mechanism, said fluid pressure valve mechanism consisting of a bellows expandingly responsive to fluid pressure from said pressure flow conduit and arranged over a valve assembly supporting a rocker arm pivotally mounted to oscillate in a vertical plane under said bellows, a cam element horizontally disposed under and suspended from said bellows and arranged to rotate over said rocker arm, said cam element having a rocker arm engaging cam portion spaced apart from and below a body portion, supporting in uplifting manner one end of said rocker arm when said cam element is rotated to one position, and disengaged from under the one end of said rocker arm and overlying the other end of said rocker arm when said lever cam is rotated to another position, said valve assembly having inlet and exhaust ports connected by a chamber including a valve ball, a pin slidingly disposed vertically in said valve assembly over said ball and under said rocker arm, said valve ball being held in closing position over said inlet port when said rocker arm is supportingly uplifted by said lever cam arm and being free to pass fluid pressure through said valve body to said exhaust port when said cam portion is rotated out of alignment and engagement with said rocker arm.

6. In a fluid pressure operated controller for a fluid pressure operated normally open motor valve which is closed upon passing pressure from controller to said motor valve, the combination consisting of a fluid pressure valve mechanism passing pressure to and closing off pressure from said motor valve, temperature responsive fluid pressure control means, and a pressure flow system through said controller connecting said fluid pressure control means and said fluid pressure valve mechanism, said valve mechanism consisting of a valve assembly with inlet and exhaust ports connected by a chamber including a valve ball, means to hold said valve ball in inlet port shut off position, including a valve assembly supported rocker arm having lugs at each end thereof, a bellows expandingly responsive to fluid pressure from said pressure flow system and having a cam element in rotating horizontal relationship suspended therefrom engageable with said valve ball holding means, said cam element having a body portion and a lug engaging arm spaced apart from and below said body portion and being rotatable into and out of engagement with said latter means, in one position said cam portion being rotatable into contact with and under a lug of said rocker arm at one end thereof and said cam element body portion being then out of contact with a rocker arm lug at the other end thereof, and in a second position said cam portion being rotatable out of contact with said first rocker arm lug and said cam element body portion being then in superimposed contact with said second rocker arm lug.

7. A selectively adjustable direct and reverse acting valve mechanism comprising a support, a valve means carried by said support, a rocker element pivotally carried by said support and having oppositely extending arms, one of said arms operatingly connected with said valve means, a fluid pressure actuator axially operable to provide a linear movement on the axis of said actuator and in a direction substantially normal to the pivot axis of said rocker arm, a cam means carried by said actuator and selectively angularly adjustable on an axis substantially parallel to the direction of operation of said actuator, said cam means being selectively adjustable to one position to engage with one arm of said rocker element to effect direct actuation of said valve means upon operation of said actuator in one direction, and selectively adjustable to a second position to engage with the other arm of said rocker element to effect reverse actuation of said valve means upon operation of said actuator in the same direction.

References Cited in the file of this patent

UNITED STATES PATENTS

| | | |
|---|---|---|
| 1,841,901 | Mabey | Jan. 19, 1932 |
| 2,141,464 | Gorrie | Dec. 27, 1938 |
| 2,261,827 | Brown | Nov. 4, 1941 |
| 2,371,428 | DeGiers | Mar. 13, 1945 |
| 2,534,251 | Dillman | Dec. 19, 1950 |
| 2,558,316 | Scharpf | June 26, 1951 |
| 2,601,377 | Ellis | June 24, 1952 |